United States Patent [19]

Anderson, Jr. et al.

[11] Patent Number: 4,595,958
[45] Date of Patent: Jun. 17, 1986

[54] MULTIFORMAT IMAGE RECORDATION

[75] Inventors: Walter F. Anderson, Jr.; Brian D. Sabo, both of St. Paul, Minn.; Louis R. Poulo, Andover, Mass.; Jan Wissmuller, Arlington, Mass.; Joseph D. Fantuzzi, Lexington, Mass.

[73] Assignee: Minnesota Mining and Manufacturing Company, St. Paul, Minn.

[21] Appl. No.: 644,491

[22] Filed: Aug. 24, 1984

[51] Int. Cl.$^4$ .................. H04N 1/21; H04N 1/04; H04N 1/46
[52] U.S. Cl. ................................ 358/296; 358/77; 358/287
[58] Field of Search .................. 358/296, 300–302, 358/11, 77, 284, 287; 364/514, 521

[56] References Cited

U.S. PATENT DOCUMENTS

| 4,237,481 | 12/1980 | Aughton | 358/80 |
|---|---|---|---|
| 4,285,587 | 8/1981 | Schiff et al. | 354/124 |
| 4,315,318 | 2/1982 | Kato et al. | 364/515 |
| 4,317,179 | 2/1982 | Kato et al. | 364/515 |
| 4,334,244 | 6/1982 | Chan et al. | 358/166 |
| 4,345,276 | 8/1982 | Colomb | 358/258 |
| 4,346,409 | 8/1982 | Ishida et al. | 358/280 |
| 4,500,930 | 2/1985 | Hamalainen et al. | 358/11 |

FOREIGN PATENT DOCUMENTS 2093661 9/1982 United Kingdom .................. 358/11

Primary Examiner—E. A. Goldberg
Assistant Examiner—Patrick W. Foster
Attorney, Agent, or Firm—Donald M. Sell; James A. Smith; Mark A. Litman

[57] ABSTRACT

A process is described for converting an image in one digital format to a second digital format by considering both horizontal and vertical values of pixels to generate output pixels of intermediate value.

13 Claims, 2 Drawing Figures

MULTIFORMAT IMAGE RECORDATION

BACKGROUND OF THE INVENTION

1. Field of the Invention

This invention relates to the recordation of multiple images on hard copy. The images are retrieved from data bank storage and approximately continuously magnified to fit into a selected format for hard copy recordation or projection. Images stored in one format may be translated to a different format and recorded or projected with other images on a single hard copy imageable material.

2. Background of the Art

Multiple ordered images are presently provided on hard copy by a slow and time consuming process. The original images are, for example, taken and recorded in a storage bank. The individual images are then singularly projected, focused through an optical lens, and recorded on a photosensitive article which provides the hard copy. To provide more than one image on the hard copy, the film (photosensitive material) or lens is repeatedly moved so that the various images are projected onto different areas of the photosensitive article. The images are usually projected by cathode ray tubes (CRT's). The images are of limited quality, even using even the best CRT's available. Poor quality in such systems may be caused by lack of resolution, phosphor mottle, geometric distortions around the edges of the CRT, etc. Additionally, such systems are inherently slow and involve mechanical movement which limit their speed and versatility. The creation of multiple copies requires the repitition of this time consuming process. Such a system is shown in U.S. Pat. Nos. 4,285,587 and 4,345,276.

Laser recording systems provide the potential for much higher quality hard copies, but laser systems cannot presently be used readily in multiple image production and format changing. The laser dot size and the positioning of individual spots are fixed by the optical system design and are not easily varied. The obvious technique of printing each image in the composition of a multi-image format will work, but the present invention offers significant advantages.

A number of different systems have been used to store digital information and project a single image onto a temporary display device or hard copy. Such single image systems are shown primarily for use in medical radiography and emphasize enhancement of the image from a digitized information source. Such enhancement systems are shown in U.S. Pat. Nos. 4,237,481, 4,315,318, 4,317,179, 4,334,244, and 4,346,409. These systems are only for single image treatment. U.S. Pat. No. 4,317,179 does mention that the system can be used in combination with other procedures such as a gradation process, reduction of image size and a smoothing process.

BRIEF DESCRIPTION OF THE INVENTION

The present invention relates to a process for providing digital information comprising a projected or final multiformatted image from digital information comprised of an original image (often where the information in the original image has fewer component pixels in at least one dimension than the projected or final image). The final image may comprise any number of original images. The original image is interpreted as a matrix of digital components (the pixels forming a matrix given by x,y coordinates), a magnification factor is determined for the conversion of the matrix of the original image into the matrix of the final image. Pixels for use in the final image matrix are generated on the basis of calculations based on values of adjacent pixels in each of the original images, and the final image matrix is composed.

This invention permits a printing system, such as one based on a laser printer, to produce a wide variety of multiple image formats and to produce multiple copies from a comprised page of images. The hard copies may be in the form of photographic images (film or prints), electrostatic images, printed image, thermographic images, photoconductive images, toned images or any other image technology.

DETAILED DESCRIPTION OF THE INVENTION

Figure 1:
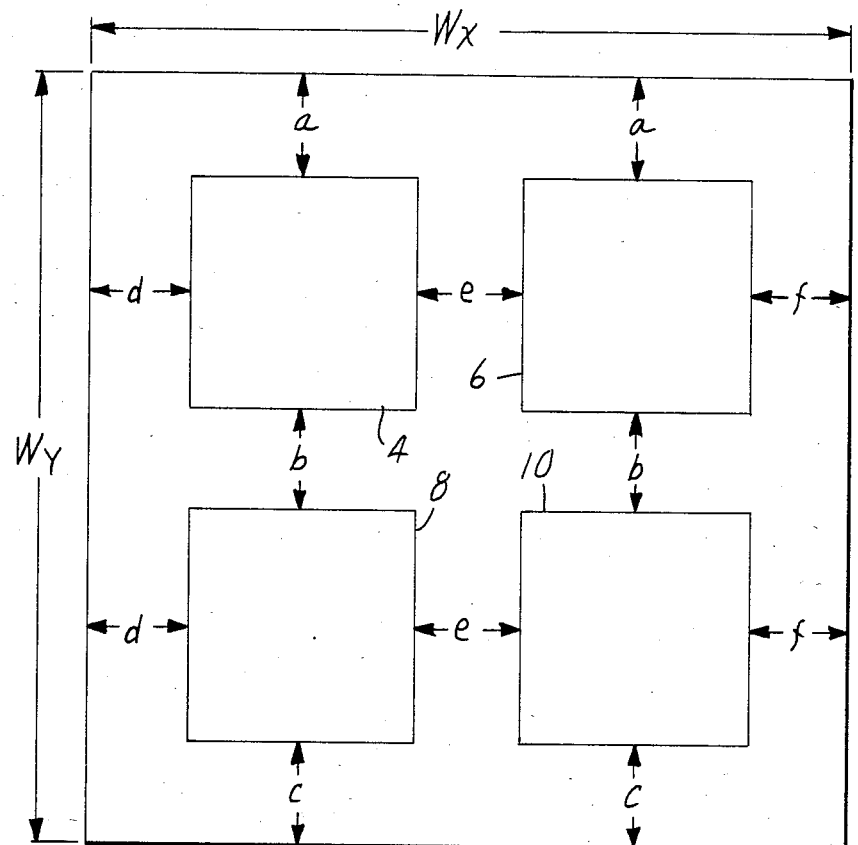
FIG. 1 shows a complete output image 2 comprised of 4 individual output images 4, 6, 8, and 10.
Figure 2:
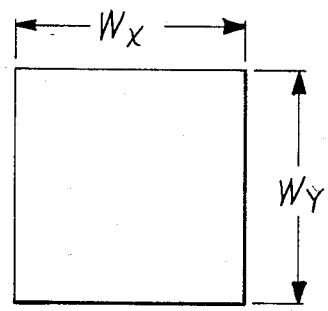
FIG. 2 shows a single output image.

The objective of the present invention is to be able to provide to imaging equipment, and particularly imaging equipment capable of producing images from digital data such as laser printers, the capability of taking information in the form of digitized pixels with respect to an original image or images and projecting said image or images in a format that has fewer, the same number of, or more pixels in the matrix of the projected image.

Pixels are quantified units of information constituting the smallest unit in the composition of the picture or image. It is convenient to use multiple valued pixels (values which are multiples of a unit value) in order to represent an image with grey levels.

The process of the present invention is for recording or projecting a digital image or images in a second format from digital information of an image in a first format where the image is said second format is composed of fewer, the same number of or more pixels in a matrix than the image or images in said first format comprising:

(a) providing information on image or images as digital data of a matrix of pixels in a first format, (b) determining a multiplication factor of one or greater than one for projection or recordation of an image or images in said second format, (c) determining by the number of pixels that must be added to the matrix of said image in said first format to generate a matrix of said image in said first format, (d) generated individual pixels of values intermediate those of individual adjacent pixels in the matrix of said first format by linear interpolation, (e) generating a matrix of digital information of said image in said second format by rational distribution of the generated values of pixels amongst the pixels of the matrix of said first image, (f) transmitting said matrix of said image in said second format to an imaging means capable of projecting or recording an image in said second format, and (g) projecting a final image onto an element or material capable of producing a hard copy from the projected final image.

An original image is first translated or interpreted in digital information. This can be done by digitizing an analog image, by using a video frame grabber, or by acquiring images from the wide range of devices (medical, satellites, etc.) which produce images in digital form. The digital information of the original image can be considered to be a matrix of X number of horizontal columns composed of Y number of pixels (and conversely Y number of vertical pixels composed of X number of pixels). The pixel is the smallest component unit of information in the composition of an image. The digitized information at this point consists of X by Y pixels of given value. For the purpose of facilitating this discussion, the values of the pixels will be assumed to lie between 0 to 600. The values in actual practice may be artibrarily chosen between any limits.

A magnification value greater than or equal to 1.0 must be selected. The magnification value is determined on the basis of the final image size chosen for use in a particular recordation or display environment. The simplest situation would be where, for example, a 2500 unit matrix (e.g., 50×50) original image is to be displayed as the single image filling the entire display or recordation surface in a system which provides a 250,000 unit matrix (e.g., 500×500) in the projected image. The magnification factor would be 10 along both the X and Y axes, determined in this system by dividing the total number of pixels in the X axis of the final image ($N_{xf}$) by the total number of pixels in the X axis of the original image ($N_{xo}$). The magnification factor along the Y axis would be similarly determined using the values for the number of pixels along the Y axis of the original image ($N_{yo}$) and the final image ($N_{yf}$). The magnification factor (M) along the X axis ($M_x$) and the Y axis ($M_y$) would therefore be determined by $$M_x = \frac{N_{xf}}{N_{xo}} \text{ and}$$

$$M_y = \frac{N_{yf}}{N_{yo}}$$

The input pixels, as well as output pixels, may represent non-square areas of the respective images; that is, the horizontal and vertical distances that make up one pixel may not necessarily be the same. This is equivalent to saying that the pixel aspect ratio is not equal to one. The pixel aspect ratio is defined as the ratio of the pixel's horizontal size to its vertical size. One objective of magnification is to produce an output image that accurately represents the input image. There should be no distortion of the image in any direction. There are actually two different types of aspect ratios in consideration here: the pixel aspect ratio, described above, and the image aspect ratio which is the ratio of the entire horizontal distance of an image to the vertical distance. The image aspect ratio is also a ratio of distances, but, in addition, reflects the size of the original digitized input image.

$W_x$ and $W_y$ represent the number of pixels in the output inage in the horizontal and vertical directions, respectively; likewise, $w_x$ and $w_y$ represent the number of pixels comprising the input image. PARo is the pixel aspect ratio of the original image and PARf is the pixel aspect ratio of the output image. Also IARo is the image aspect ratio of the input (same as original) image, and IARf is the image aspect ratio of the output. The relationships between the pixel aspect ratios and the image aspect ratios is shown below.

$$IARo = \frac{PARo \, w_x}{w_y}, \; IARf = \frac{PARf \, W_x}{W_y}$$

The goal of no distortion can be attained only if the two image aspect ratios are equal, e.g., IARo is equal to IARf. This equality imposes a restriction on the calculation of the magnifications. The output image is composed of a fixed number of pixels. In order to match the image aspect ratios, the input image will not necessarily be magnified to fill the entire output image; for example, a rectangular input image will be magnified into a similarly shaped output image, regardless of whether the actual output display is rectangular.

$W_x$ and $W_y$, as defined above, represent the size of the input image after magnification. This magnified input image will be part of the output image and must be equal to or less than the size of the output image. $W'_x$ and $W'_y$ represent the limiting size of the output image, and $M_x$ and $M_y$ are the actual magnifications used, and $M'_x$ and $M'_y$ are the maximum magnifications possible. These magnifications are defined by $$M_x = \frac{W_x}{w_x} \; M'_x = \frac{W'_x}{w_x}$$

$$M_y = \frac{W_y}{w_y} \; M'_y = \frac{W'_y}{w_y}$$

The actual magnifications $M_x$ and $M_y$ must be less than or equal to the maximum magnifications $M'_x$ and $M'_y$ in order for the magnified input image to fit into the output image.

The condition that the image aspect ratios must be equal results in the following conclusion:

$$\frac{PARo}{PARf} = \frac{M_x}{M_y}.$$

This condition must be satisfied when calculating the magnifications so that no distortion will result. This restriction along with the desire to have the largest magnification possible within the bounds of the output image results in the following equations:

$$M'_x \text{ if } \frac{M'_x \, PARf}{PARo} \leq M'_y \text{ is true,}$$

OR $$M_x = \frac{M'_y \, PARo}{PARf} \text{ otherwise.}$$

$$M_y = \frac{M_x \, PARf}{PARo}$$

With these equations, the horizontal and vertical magnification factors may be calculated and still retain the image aspect ratio. This analysis removes any problems due to rectangular pixel sizes on input or output, or both. In a straightforward way, this calculation may be extended to the case of multiple images being projected into the output image.

The next simplest format conversion would be in determining M when projecting more than one original image onto a larger format, or projecting one original image onto only a portion of a larger format. Again, assuming a 2500 unit (50×50) original matrix and a 250,000 unit (500×500) projection matrix, it is predetermined that P original images shall be projected as the final image or that the final image of one original image shall occupy with no blank or non-information space between images, and filling the maximum space in the projection format, only a fraction of the area of the projection format. The magnification values, assuming no differential magnification of X and Y axes, would be $$M_x = M_y = MIN \frac{N_{xf}}{N_{xo}} \frac{1}{n_x}, \frac{N_{yf}}{N_{yo}} \frac{1}{n_y}$$

where n is the number of pictures in a horizontal (for x axis calculations) direction, using the limiting value of the smallest magnification possible between the two resulting values. For example if P is 20 pictures, one possible orientation would be no more than five final images linearly arranged on the projection format (a 5 picture by 4 picture matrix). The value of n for the example under discussion is thus the maximum number of pictures allowed horizontally and/or vertically, whichever is greater. The magnification value would thus be two.

A more difficult situation for determining the magnification factor would exist where a multitude of pictures were to be projected, minimum border areas were required, and minimum spacing was required between pictures. The magnification factor can be determined for such situations by hardware, software or predetermined values which effectively remove consideration of area in the projected format which is dedicated to border and spacing and allocate the remaining area to an artificial, conceived final format which is treated as a final projection screen in the manner of preceeding examples.

Looking at FIG. 1, a complete output image 2 is shown comprised of four individual output images, 4, 6, 8 and 10. The distances of the edges of the individual output images from the edge of the complete output image defines the border. In the Figure, a is the top vertical border, c is the bottom vertical border, d is the left horizontal border and f is the right horizontal border. $W_x$ is the total number of pixels in the width of the complete output image 2, $W_y$ is the total number of pixels in the height of the complete image, $w_x$ is the total number of pixels in the width of an input image, and $w_y$ is the total number of pixels in the vertical direction of an input image. b is the vertical spacing between images and e is the horizontal spacing between images. Magnification can be then determined according to the formula $$M_x = \frac{w_x - (d + e + f)}{2w_x} =$$

$$\frac{\text{No. Horizontal Pixels in Complete Output Image}}{\text{Number of Horizontal Images}} - \frac{\text{Sum of Pixels Count in Horizontal Borders and Spacing}}{\text{Number of Pixels in Horizontal Input Image}}$$

$$M_x = \frac{W_y - (a + b + c)}{2w_y} =$$

$$\frac{\text{No. Vertical Pixels in Complete Output Image}}{\text{Number of Vertical Images}} - \frac{\text{Sum of Pixel Count in Vertical Borders and Spacing}}{\text{Number of Pixels in Vertical Input Image}}$$

With input image size known, the magnification factor can be calculated independent of the source of the images. The image size information of the original digital image and the format used in the display or recordation can be used to determine the magnification factor. For example, an imaging apparatus with 4000 horizontal by 5000 vertical array of pixels with a spot size of 100 microns is used in this algorithm with predetermined borders and spaces between images. The following formulae can be used to calculate proper magnification factors. Horizontal magnification=(((400−Sh)/Nh)×10)/Pl Vertical magnification=(((500−Sv)/Nv)×10)/Li
where:
  Pl=number of pixels per line in one image
  Li=number of lines per image
  Nh=number of frames to be printed horizontally
  Nv=number of frames to be printed vertically
  Sh=total horizontal space between images in mm.
  Sv=total vertical shape required between images in mm.

The lesser of the magnification factors calculated is chosen, truncated to two (or other number) decimal places, and used in both the horizontal and vertical directions. Note the formulaes were designed to produce a minimum of 5 mm borders between images for format 12, 10 mm borders for formats 6 and 4, and no borders for format 1. The relationship between format and the values of the variables to be used in the above formulas is shown in the table below:

| Format | Sh | Nh | Sv | Nv |
|--------|----|----|----|----|
| 1 | 0 | 1 | 0 | 1 |
| 4 | 10 | 2 | 10 | 2 |
| 6 | 10 | 2 | 20 | 3 |
| 12 | 10 | 3 | 15 | 4 |

Magnification, as opposed to demagnification, involves the creation of a set of output pixels to represent the image form a smaller set of input pixels. Magnification along the axes do not have to be the same. The set of output pixels may comprise a whole new set of pixels, not just the pixels to be added in between the original pixels. Some, all, or none of the actual original pixels may be used depending on whether they fall on the top of the desired output pixel. There are many choices available as to how to generate these additional pixels. As a brief illustration of some of the choices, a one dimensional graph is drawn below.

| # | # | o # | # | # |
|---|---|-----|---|---|
| 10 | 30 | 50 | 20 | 40 | where
  # represents input pixels, with their values beneath o the desired position of an output pixel.
The objective is to define a value for the output pixel labelled 'o' as some meaningful function of the known input pixels '#'. One method, known as replication, is to assign the output pixel the value of the nearest input pixel which in this case is 50. This method causes the pixels of the input image to be represented in general by small rectangular and square areas in the output image.

Another method, known as linear interpolation, assigns the output pixel a scaled value determined by its proximity to its two nearest neighbors. For this example, the output pixel is ¾ of the way from the second pixel to the third pixel. The output value then is closer to the third pixel's value but adjusted by the value of the second:

$$\text{out} = (\tfrac{3}{4})*50 + (\tfrac{1}{4})*30 = 45$$

Another method would be to average the nearest two neighbors, which in this case would result in an output value of 40. Another is to take the median value of the nearest three neighbors: 30. There are many other choices available.

The process is practiced line by line in both horizontal and vertical lines of pixels. Adjacent pixels in these lines are considered as having a continuous graded tone or graded value between the pixels. Pixels of equal value (on the exemplary assumed scale of 0 to 600) would have a considered continuous and uniform value equal to the value of the pixels between them. This continuous value is used to determine the value of the new pixels when constructing the final image.

Each of the one dimensional examples may be expanded to two dimensions. As an example, bilinear interpolation will be described. The actual value of the individual or added pixel could be determined by $$Z = A + (B - A)\frac{X}{M_x} + (C - A)\frac{Y}{M_y} + (D + A - C - B)\frac{XY}{M_xM_y}$$

wherein
- A is the value of an original pixel,
- B is the value of an adjacent original pixel along the X axis,
- C is the value of an adjacent original pixel along the Y axis,
- D is the value of the original pixel adjacent the pixels of value B and C,
- M is the magnification factor for the respective dimension,
- X is the number of horizontal pixels,
- Y is the number of vertical pixels, and
- Z is the value of the output pixel.

Other linearly weighted values for the additional pixels could of course be used as could other programs for determining the number of additional pixels placed between any two adjacent original pixels.

We claim:

1. A process for recording or projecting a digital image or images in a second format from digital information of an image in a first format where the image is said second format is composed fewer, the same number of or more pixels in a matrix than the image or images in said first format comprising:

(a) providing information on image or images as digital data of a matrix of pixels in a first format, (b) determining a magnification factor for projection or recordation of an image or images in said second format, (c) determining the number of pixels that must be added to the matrix of said image in said first format to generate a matrix of said image in said second format, (d) generating individual pixels of values intermediate those of individual adjacent pixels in the matrix of said first format by linear interpolation, (e) generating a matrix of digital information of said image in said second format by rational distribution of the generated values of pixels amongst the pixels of the matrix of said first image, (f) transmitting said matrix of said image in said second format to an imaging means capable of projecting or recording an image in said second format, and (g) projecting a final image onto an element or material capable of producing a hard copy from the projected final image.

2. The method of claim 1 wherein the individual pixels of values intermediate those of individual adjacent pixels in the matrix of said first format are generated by the algorithm $$Z = A + (B - A)fx + (C - A)fy + (D - B - C + A)fxfy$$

where
- A is the value of an original pixel in the matrix of said first format,
- B is the value of the pixel adjacent to A along the X axis,
- C is the value of a pixel adjacent to A along the Y axis,
- D is the value of a pixel adjacent the pixels of value B and C,
- fx is the distance that an output pixel of value Z is located from pixel A along the X axis,
- fy is the distance that an output pixel of value Z is located from pixel C along the Y axis, and
- Z is the value of an output pixel which is located within a rectangle formed by pixels of value A, B, C and D.

3. The method of claim 1 wherein the magnification factor is determined for a final image comprising multiple images with borders and spacing.

4. The method of claim 3 wherein a horizontal magnification factor is determined by the formula Magnification (horizontal) =

$$\frac{\text{No. Horizontal Pixels in Complete Output Image}}{\text{Number of Horizontal Images}} - \frac{\text{Sum of Pixels Count in Horizontal Borders and Spacing}}{\text{Number of Pixels in Horizontal Input Image}}$$

5. The method of claim 3 wherein a vertical magnification factor is determined by the formula Magnification (vertical) =

$$\frac{\text{No. Vertical Pixels in Complete Output Image}}{\text{Number of Vertical Images}} - \frac{\text{Sum of Pixel Count in Vertical Borders and Spacing}}{\text{Number of Pixels in Vertical Input Image}}$$

6. The process of claim 1 in which more than one image in said second format is projected at the same time onto said element or material capable of producing a hard copy.

7. The process of claim 2 in which more than one image in said second format is projected at the same time onto said element or material capable of producing a hard copy.

8. The process of claim 3 in which more than one image in said second format is projected at the same time onto said element or material capable of producing a hard copy.

9. The process of claim 4 in which more than one image in said second format is projected at the same time onto said element or material capable of producing a hard copy.

10. The process of claim 5 in which more than one image in said second format is projected at the same time onto said element or material capable of producing a hard copy.

11. The process of claim 1 wherein the magnification factor is greater than one.

12. The process of claim 2 wherein the magnification factor is greater than one.

13. The process of claim 7 wherein the magnification factor is greater than one.

* * * * *